US012771394B2

(12) United States Patent
Zheng et al.

(10) Patent No.: US 12,771,394 B2
(45) Date of Patent: Oct. 20, 2026

(54) CIRCUITRY ON ANTENNA MODULE, ANTENNA MODULE, AND SYSTEM COMPRISING THE SAME

(71) Applicant: HEWLETT PACKARD ENTERPRISE DEVELOPMENT LP, Spring, TX (US)

(72) Inventors: Jiguang Zheng, Beijing (CN); Hailong Bai, Beijing (CN); Hongli Zhang, Beijing (CN); Yue Sun, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 291 days.

(21) Appl. No.: 18/612,568

(22) Filed: Mar. 21, 2024

(65) Prior Publication Data

US 2025/0300686 A1 Sep. 25, 2025

(51) Int. Cl.
*H04B 1/16* (2006.01)
*H04B 1/40* (2015.01)
*H04L 7/033* (2006.01)

(52) U.S. Cl.
CPC ............. *H04B 1/1607* (2013.01); *H04B 1/40* (2013.01); *H04L 7/033* (2013.01)

(58) Field of Classification Search
CPC .......... H04B 1/1607; H04B 1/40; H04L 7/033
See application file for complete search history.

(56) References Cited

U.S. PATENT DOCUMENTS

2021/0227396 A1* 7/2021 Khalid .................. H04W 16/28
2024/0255606 A1* 8/2024 Zheng ........................ G01S 5/04
2025/0147124 A1* 5/2025 Sasaki .................. G01R 31/016

FOREIGN PATENT DOCUMENTS

CN 105978539 A * 9/2016 ............ H03K 5/135

OTHER PUBLICATIONS

Aruba, “Full Featured Transparent I2C Bus and Power for Antenna Board”, Sep. 2023, 23 pages.
I2c spec, “UM10204 12C-bus specification and user manual Rev. 7.0”, Oct. 1, 2021, User manual, 62 pages.

* cited by examiner

*Primary Examiner* — Curtis A Kuntz
(74) *Attorney, Agent, or Firm* — Hewlett Packard Enterprise Patent Department

(57) ABSTRACT

Implementations of the present disclosure relate to a circuitry system for a wireless system. The circuitry system includes a first circuit located at the outdoor antenna module, and a second circuit and a third circuit located at the wireless access point. When any component on the outdoor antenna module triggers the clock stretch, the state of demodulated clock signal will change, and the first circuit can change the power consumption level of the outdoor antenna module according to the state change. The second circuit can sense changes in the power consumption level and can output a control signal corresponding to the power consumption level. The control signal can control the third circuit. The third circuit can associate the state of the initial clock signal with the clock stretch state of the plurality of components according to the control signal, thereby realizing bidirectional transmission of the clock signal.

19 Claims, 7 Drawing Sheets

CIRCUITRY ON ANTENNA MODULE, ANTENNA MODULE, AND SYSTEM COMPRISING THE SAME

BACKGROUND

There are some devices on the outdoor antenna module of the wireless system that require the use of clock signals, such as $I^2C$ devices. These $I^2C$ devices use the $I^2C$ bus to transmit data to the wireless access point (AP). According to the $I^2C$ signal transmission standard, the $I^2C$ clock signal should be a signal that can be transmitted bi-directionally between the outdoor antenna module and the AP. However, the signal transmission between the traditional outdoor antenna module and the AP can only be transmitted from the AP to the outdoor antenna module, and does not support bidirectional transmission.

BRIEF DESCRIPTION OF THE DRAWINGS

Through the following detailed descriptions with reference to the accompanying drawings, the above and other objectives, features, and advantages of the example implementations disclosed herein will become more comprehensible. In the drawings, several example implementations disclosed herein will be illustrated in an example and in a non-limiting manner, where.

DETAILED DESCRIPTION

Figure 1:
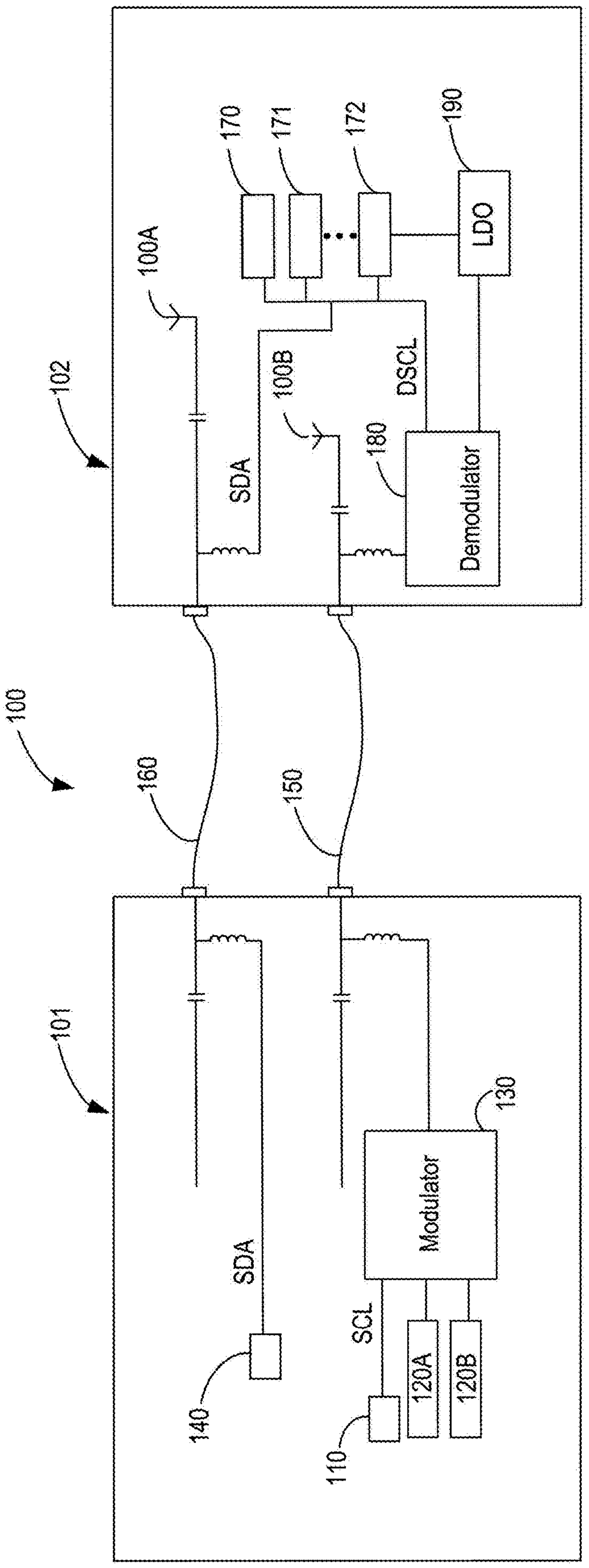
FIG. 1 illustrates a schematic diagram illustrating an example environment in which example implementations of the present disclosure may be implemented.

Traditionally, there is no power and digital interface for the sensors in the antenna module, such as digital compasses and declinometers. Thus, the sensor cannot be powered to sense the directional antenna (such as the 6 GHz antenna), and data cannot be transmitted between the 6 GHz antenna and the AP. When the digital compass or declinometer is installed on a 6 GHz antenna outdoors to sense the location, direction, coverage area, and the like of the 6 GHz antenna, the sensor needs to be supplied with electrical power so as to sense the directional 6 GHz antenna. The data sensed by the sensor should be transmitted to the AP indoors. Although the wireless communication, such as Blue Tooth, is widely used to transmit data, the wireless communication will be negative for regulatory and introduce a security risk, and cannot be used to power the sensors. It would be beneficial to transmit the data and supply the power through cables.

Generally, the outdoor device needs to withstand harsh weather and at least should be waterproof. If new dedicated cables are used to transmit the sensed data and supply power to the sensors, on the one hand, the installation process for the dedicated cable will be more complicated, and thus, the cost will be increased. On the other hand, the dedicated cable will also increase the risk of water leakage.

The RF cable is designed to transmit and receive the RF signal, which is of the frequency from 2.4 GHz to 6 GHz, between the indoor AP and the outdoor antenna. If the data sensed by the sensor and the power supplied to the sensor can be transmitted over the existing RF cables, there is no need for any dedicated cable, thereby simplifying the installation process and reducing the cost and the risk of water leakage. Thus, for example, two RF cables are used, one of the two RF cables is used to transmit the modulated power and clock signal to the outdoor external antenna, and the other of the two RF cables is used to transmit the data (for example, data transmitted via $I^2C$ interface) between the outdoor passive antenna and the indoor AP.

As described above, there are some devices on the outdoor antenna module of the wireless system that require the use of clock signals, such as $I^2C$ devices. These $I^2C$ devices use the $I^2C$ bus to transmit data to the wireless access point (AP). According to the $I^2C$ signal transmission standard, the $I^2C$ clock signal should be a signal that can be transmitted bi-directionally between the outdoor antenna module and the AP. However, the signal transmission between the traditional outdoor antenna module and the AP can only be transmitted from the AP to the outdoor antenna module, and does not support bidirectional transmission.

To address the problems in the typical design as discussed above, example implementations of the present disclosure propose a circuitry system for a wireless system including an outdoor antenna module and a wireless access point. The circuitry system includes a first circuit located at the outdoor antenna module, and a second circuit and a third circuit located at the wireless access point. The outdoor antenna module is provided with a plurality of components that need to use demodulated clock signals, and any of these components may trigger clock stretch. The first circuit is configured to receive a demodulated clock signal, and the state of the demodulated clock signal is affected by the clock stretch. Thus, when at least one of the plurality of components triggers the clock stretch, the state of demodulated clock signal will change, and the first circuit can change the power consumption level of the outdoor antenna module according to the state change. The second circuit can sense changes in the power consumption level of the outdoor antenna module and can output a control signal corresponding to the power consumption level. The control signal can control the third circuit. The third circuit also receives an initial clock signal, which is processed to become a demodulated clock signal. The third circuit can change the state of the initial clock signal according to the received control signal, so that the state of the initial clock signal can correspond to the clock stretch state of the plurality of components on the outdoor antenna module, thereby realizing bidirectional transmission of the clock signal.

FIG. 1 is a schematic diagram illustrating an example environment in which example implementations of the present disclosure may be implemented. As illustrated in FIG. 1, the system 100 includes an AP 101 and an antenna module 102. The AP is a networking device that allows wireless-capable devices to connect to a wired network. With the development of the wireless communication technology, the AP is provided with a multiple input multiple output (MIMO) system, so as to improve the transmission rate and bandwidth utilization of information. Corresponding, the AP is provided with a plurality of front-end modules (FEMs). Communications between the AP and the wireless-capable devices may operate according to wireless communication protocols such as the Institute of Electrical and Electronic Engineers (IEEE) 802.11 standards, Wi-Fi Alliance Specifications, or any other wireless communication standards. The IEEE 802.11 standards may include the IEEE 802.11ay standard (e.g., operating at 60 GHz), the IEEE 802.11ad standard (sometimes referred to as "WiGig"), the IEEE 802.11be (referred to as "WIFI 7") or any other wireless communication standards.

As illustrated in FIG. 1, the antenna module 102 is provided with at least one directional antenna 100A and 100B (such as a passive 6 GHz antenna) and at least one $I^2C$ devices 170, 171, and 172 (for example, sensors, microprogrammed control unit (MCU)) to sense the location, the direction, and the coverage and the like of the 6 GHz antenna, or perform control or calculation. The $I^2C$ devices 170, 171, and 172 are required to be powered by electrical power from the AP 101. As illustrated in FIG. 1, the directional antenna 100A or 100B is, for example, a passive direction antenna that can generate information about the direction thereof. In some implementations, the directional antenna 100A or 100B may be an external 2×2 6 GHz panel antenna, including two directional antennas.

The $I^2C$ interface is usually a powerful bus used for communication between a master (or multiple masters) and a single or multiple slave device(s). The physical $I^2C$ interface consists of the serial clock (SCL) and serial data (SDA) lines. The $I^2C$ devices 170, 171, and 172 may be provided with an $I^2C$ interface to transmit and receive data or electrical power. Accordingly, the AP 101 is provided with a corresponding SCL line for transmitting a clock signal and a corresponding SDA line for transmitting and receiving data. As illustrated in FIG. 1, the AP 101 includes a clock signal source 110, such as an SCL line of the $I^2C$ interface; and a data signal source 140, such as an SDA line of the $I^2C$ interface. The clock signal source 110 is configured to transmit or generate a clock signal having alternate high power level and low power level. The clock signal may be transmitted to the $I^2C$ devices 170, 171, and 172 provided on the antenna module 102. The SDA line 140 is configured to send a request to the $I^2C$ devices 170, 171, and 172 and then receive the sensed data from the $I^2C$ devices 170, 171, and 172, such as information about the location, the direction, and the coverage area of the directional antenna 100A or 100B.

Continue to refer to FIG. 1, the AP 101 further includes a first power supply 120A and a second power supply 120B. The first power supply 120A may be a power supply for providing a high voltage, for example, 5V, and the second power supply 120B may be a power supply for providing a low voltage, for example, 4.2V.

As discussed above, there is no power supply at the passive antenna (such as a passive 6 GHz antenna). If $I^2C$ devices, such as digital compasses and declinometers, are provided on the passive antenna (such as the passive 6 GHz antenna) to sense the location, the direction, and the coverage of the antenna, the sensors should be supplied with electrical power to work. Further, the data from the $I^2C$ devices 170, 171, and 172 may be transmitted to the AP 101, and dedicated cables for transmitting the data and the clock signal may increase the risk of water leakage. Therefore, as illustrated in FIG. 1, the system 100 further includes two RF cables 150 and 160 for powering the antenna and transmitting data between the AP and the antenna to avoid the risk of water leakage.

As illustrated in FIG. 1, the AP 101 further comprises a modulator 130 connected to the clock signal source 110, the first power supply 120A, and the second power supply 120B so as to receive the clock signal and the power voltages. The modulator 130 is configured to modulate the clock signal and the power voltages into a single modulated power. Since the clock signal has alternate high voltage and low voltage, the modulated power has high power voltage and low power voltage alternated with each other. In some implementations, in the modulated power, the high power voltage is about 5V, and the low power voltage is about 4.2V.

As illustrated in FIG. 1, the modulated power of high voltage (for example, 5V) and low voltage (for example, 4.2V) is transmitted to the antenna module 102 over a radio cable 150, for example, an RF cable for SCL, which is one of two cables designed for the 2×2 panel antenna. As illustrated in FIG. 1, the sensed data is transmitted to the AP 101 through the other radio cable 160, for example, an RF cable for SDA, which is the other of two cables designed for the 2×2 panel antenna. The RF cable is configured to transmit the radio frequency signal, typically having a frequency from 2.4 GHz to 6 GHz. Meanwhile, the clock signal typically has a frequency from 50 kHz to 500 kHz, which is much less than that of the RF signal. Since the RF choke can provide good isolation between $I^2C$ and RF signals, there is no interference between the modulated power and the RF signal.

The modulated power is transmitted to the antenna module 102 over the radio cable 150 so as to power the $I^2C$ devices 170, 171, and 172. Since the modulated power cannot be used as the clock signal for the $I^2C$ devices 170, 171, and 172, as illustrated in FIG. 1, the antenna module 102 further includes a demodulator 180 connected to the radio cable 150 and configured to receive and demodulate the modulated power into a demodulated clock signal. The demodulated power has the same frequency or duty cycle as the clock signal, and thus reproduces the clock signal to a large extent. The demodulated clock signal is then received by the $I^2C$ devices 170, 171, and 172. In some implementations, the output of the demodulator 180 should be an open drain or collector to comply with the $I^2C$ specification.

The $I^2C$ devices 170, 171, and 172 may be further powered by the modulated power so as to sense the location, direction, coverage, and the like of the 6 GHz antenna, or perform some calculations. As illustrated in FIG. 1, the antenna module 102 is further provided with a Low Dropout Regulator (LDO) 190 configured to receive the modulated power and transform the alternate high voltage and low voltage to a constant voltage, for example, 3.3V, which is to be supplied to the $I^2C$ devices 170, 171, and 172 to power them.

By the system 100 as illustrated in FIG. 1, it is possible to deploy compass/declinometer sensors on a 6 GHz panel antenna for AFC requirement and RF visualizations, so as to obtain the location, the direction and the coverage area and the like of the 6 GHz antenna. Further, by providing the modulator in the AP and the demodulator in the antenna module, the desired signal (such as a clock signal) and the power voltage can be modulated at the modulator into a single modulated power. The single modulated power can be transmitted to the antenna module over one single RF cable, and then the modulated power received from one single RF cable can be demodulated at the demodulator to a clock signal. Thus, a single existing RF cable, which is designed to transmit the RF signal, can be used to transmit a modulated power, and there is no necessity to provide a dedicated cable to transmit the clock signal and another dedicated cable to supply the power voltage to the sensor. Therefore, the installation process can be simplified, the cost can be significantly reduced, and the risk of water leakage can be reduced.

Figure 2:
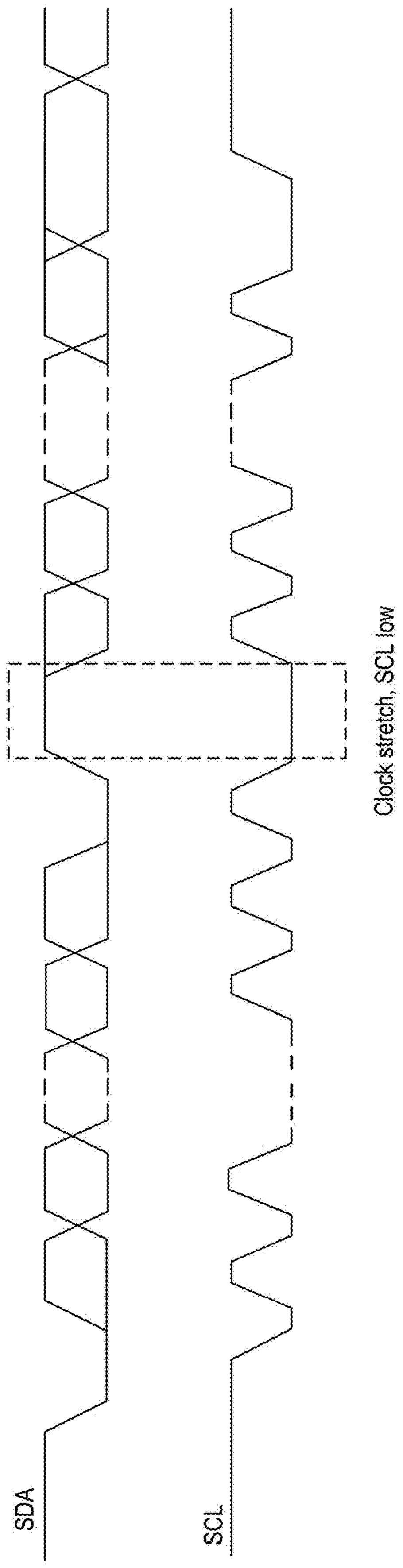
FIG. 2 illustrates a schematic diagram of a signal according to an $I^2C$ protocol in accordance with some example implementations of the present disclosure.

FIG. 2 illustrates a schematic diagram of a signal according to an $I^2C$ protocol in accordance with some example implementations of the present disclosure.

As illustrated in FIG. 2, a clock stretch is a feature of $I^2C$ protocol signal for $I^2C$ devices, and clock stretch keeps level on the SCL line to be low, as shown by the rectangle block of FIG. 2. The service cannot continue until the SCL is first re-released to high voltage, as shown in FIG. 2. During the clock stretch phase, the voltage on the SCL line remains low. If the target $I^2C$ device is unable to receive or transmit another complete byte of data until the $I^2C$ device performs another function (such as serving an internal interrupt), the target $I^2C$ device keeps the clock SCL line low to force the controller (for example, on the AP, and the controller may generate clock signal) into a waiting state. When that target $I^2C$ device is ready to receive another byte of data, the data transfer continues, and the SCL line that remains low is released as high. When clock stretch occurs (for example, the target antenna module keeps the SCL line low), the controller on the AP side is required to get knowledge of the clock stretch and enter into a waiting state, that is to say, the $I^2C$ clock signal requires to be transmitted bi-directionally between the AP and the antenna module.

Figure 3A:
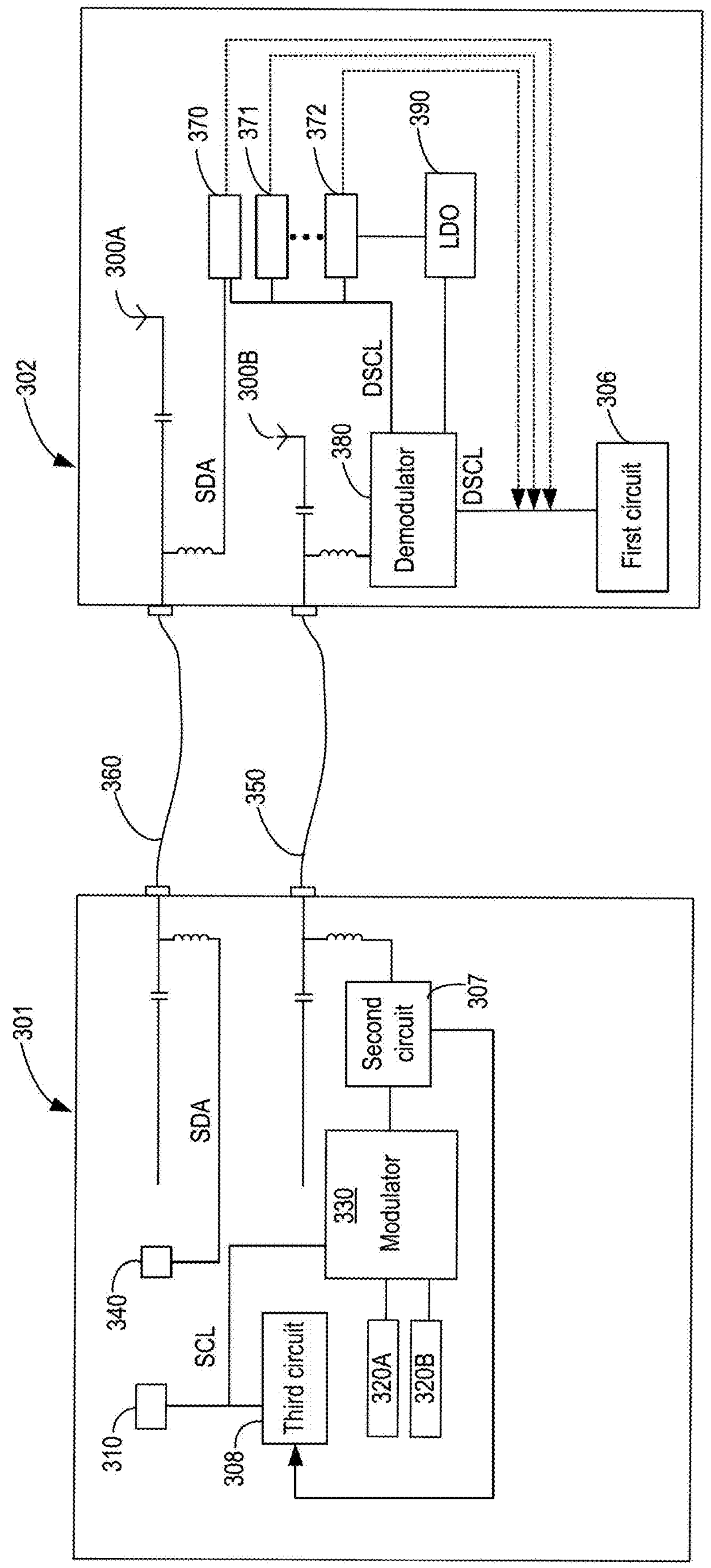
FIG. 3A illustrates a schematic diagram of a wireless system in accordance with some example implementations of the present disclosure.
Figure 3B:
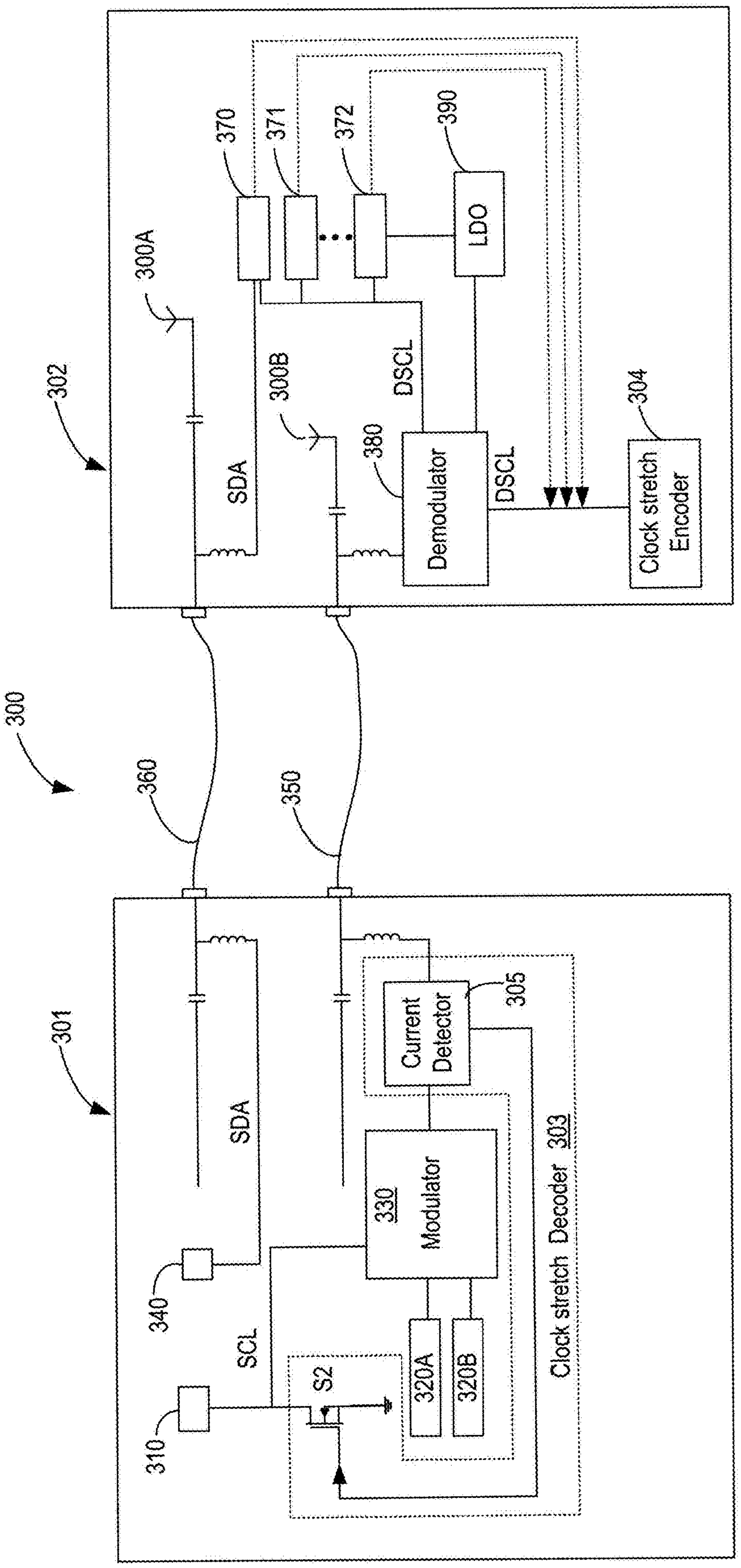
FIG. 3B illustrates an exemplary wireless system comprising circuits for sensing clock stretch in accordance with some example implementations of the present disclosure.

FIG. 3A illustrates a schematic diagram of a wireless system in accordance with some example implementations of the present disclosure, and FIG. 3B illustrates an exemplary wireless system comprising circuits for sensing clock stretch in accordance with some example implementations of the present disclosure. As illustrated in FIGS. 3A and 3B, the wireless system 300 corresponds to the wireless system 100 of FIG. 1; the AP 301 and the antenna module 302 correspond to the AP 101 and the antenna module 102 of FIG. 1; the directional antennas 300A and 300B correspond to the directional antennas 100A and 100B of FIG. 1; the RF cables 350 and 360 correspond to the RF cables 150 and 160 of FIG. 1; the clock signal source 310 and the data signal source 340 correspond to the clock signal source 110 and the data signal source 140 of FIG. 1; the $I^2C$ devices 370, 371, and 372 correspond to the $I^2C$ devices 170, 171, and 172; the first power supply 320A and a second power supply 320B correspond to the first power supply 120A and a second power supply 120B of FIG. 1; and the modulator 330, the demodulator 380, and the LDO 390 correspond to the modulator 130, the demodulator 180, and the LDO 190 of FIG. 1.

Except for the components mentioned above, the wireless system 300, as shown in FIG. 3A further comprises a first circuit 306 located at the outdoor antenna module 302, and a second circuit 307 and a third circuit 308 both located at the AP 301. The first circuit 306 may receive a demodulated clock signal DSCL from the demodulator 380. The first circuit 306 may function to change a power consumption level of the outdoor antenna module 302 as a state of the demodulated clock signal (DSCL) changes. In some implementations, the change of the state of the demodulated clock signal is associated with a clock stretch of the $I^2C$ devices 370, 371, and 372. For example, when any of the $I^2C$ devices 370, 371, and 372 trigger a clock stretch, the clock stretch may pull down the DSCL transmitted to the first circuit 306 to a low level. Then, due to the low level of the DACL, the current flow through the first circuit 306 may change such that the power consumption level of the outdoor antenna module 302 may vary accordingly.

As shown in FIG. 3A, the second circuit 307 may sense the power consumption level of the outdoor antenna module 302 through the RF cable 350, and the second circuit 307 may further output a control signal based on the sensed power consumption level. The control signal of the second circuit 307 may be transmitted to the third circuit 308. The third circuit 308 may associate a state of the initial clock signal with the state of the demodulated clock signal in accordance with the control signal, such that when any of the $I^2C$ devices 370, 371, and 372 triggers a clock stretch, the clock stretch may be transmitted to the AP, especially to the third circuit to pull down the initial clock signal.

In some implementations, as shown in FIG. 3B, the clock stretch encoder 304 may be an example of first circuit 306. The clock stretch encoder 304 is configured to change a power consumption level of the outdoor antenna module 302 as a state of the demodulated clock signal (DSCL) changes. In some implementations, the change of the state of the demodulated clock signal is associated with a clock stretch of at least one of a plurality of components (for example, the $I^2C$ devices 370, 371, and 372) on the outdoor antenna module 302 that are configured to use the demodulated clock signal. For example, when any of the $I^2C$ devices 370, 371, and 372 triggers a clock stretch, the indication of the clock stretch may be transmitted to the connection line between the demodulator 380 and the clock stretch encoder 304 such that the DSCL may be pulled down to a low level. Then, as the level change of the DSCL, the current flow through the clock stretch encoder 304 may change such that the power consumption level of the outdoor antenna module 302 may vary accordingly. In some implementations, when any of the $I^2C$ devices 370, 371, and 372 triggers a clock stretch, these devices may run at a minimum power consumption level, and when the $I^2C$ devices 370, 371, and 372 do not trigger a clock stretch, these devices may run at a maximum power consumption level.

As shown in FIG. 3B, the clock stretch decoder 303 comprises a current detector 305 and a switch S2. The current detector 305 may be an example of the second circuit 307, and the switch S2 may be an example of the third circuit 308. The current detector 305 is connected to the outdoor antenna module 302 through the RF cable 350, and thus may sense the power consumption level of the outdoor antenna module 302 through the RF cable 350. Accordingly, the current detector 305 may output a control signal corresponding to the power consumption level of the outdoor antenna module 302 to switch on the switch S2 or switch off the switch S2.

For example, when any of the $I^2C$ devices 370, 371, and 372 trigger a clock stretch, the power consumption level of the outdoor antenna module 302 changes, and for example, the current flow through the RF cable 350 may change. The current detector 305 may sense the current flow through the RF cable 350 and output a control signal to the switch S2 to switch on the switch S2. As shown in FIG. 3B, since the switch S2 is connected between the clock signal source 301 and the ground, when the switch S2 is switched on, the clock signal source 301 may be grounded such that the SCL is pulled down to be a low level.

That is to say, when the DSCL changes to be a low level due to the clock stretch of any of the $I^2C$ devices 370, 371, and 372, the clock stretch encoder 304 may sense the change of the DSCL. Through the RF cable 350 connected to the outdoor antenna module 302 and the clock stretch decoder 303, the clock stretch decoder 303 may also sense the change of the DSCL, and output a control signal to the switch S2 to pull down the clock signal source 110 to be a low level. Thus, the clock stretch requirement of the $I^2C$ devices 370, 371, and 372 may also be transmitted to the AP, such that the clock signal source 110 may output low level clock signal.

As shown in FIG. 3B, in absence of any clock stretch requirement of the $I^2C$ devices 370, 371, and 372, the switch S2 is switched off, such that the SCL signal from the clock signal source 110 will not be pulled down, and the normal clock signal may be provided to the modulator 330 to modulate with a first power voltage from the first power supply 320A and a second power voltage from the second power supply 320B to form a modulated power. As mentioned above, the modulator power may be transmitted to the outdoor antenna module 302 through the RF cable 350, and to be demodulated by the demodulator 380 to be a DSCL. Then, the DSCL may be provided to the $I^2C$ devices 370, 371, and 372. That is to say, the clock signal from the clock signal source 110 may be provided to the $I^2C$ devices 370, 371, and 372. Therefore, the clock signal may be transmitted bi-directionally between the $I^2C$ devices 370, 371, and 372 and the clock signal source 110. The clock signal source 110 may be included in a controller at the AP 301 for generating the clock signal.

In circuitry system as shown in FIG. 3A and FIG. 3B, the circuitry system 300 includes a first circuit (for example, clock stretch encoder 304) located at the outdoor antenna module 302 and a second circuit (for example, current detector 305), and a third circuit (for example, the switch S2 connected to the ground) located at the wireless access point 301. The outdoor antenna module 302 is provided with a plurality of components 370, 371, and 372 that need to use demodulated clock signals, and any of these components may trigger clock stretch. The first circuit (for example, clock stretch encoder 304) is configured to receive a demodulated clock signal DSCL, and the state of the demodulated clock signal is affected by the clock stretch of the devices 370, 371, and 372. Thus, when at least one of the plurality of components 370, 371, and 372 triggers the clock stretch, the state of demodulated clock signal DSCL will change, and the first circuit (for example, clock stretch encoder 304) can change the power consumption level of the outdoor antenna module 302 according to the state change. The second circuit (for example, current detector 305) can sense changes in the power consumption level of the outdoor antenna module 302 and can output a control signal corresponding to the power consumption level. The control signal can control the third circuit (for example, the switch S2 connected to the ground). The third circuit also receives an initial clock signal SCL, which is processed to become a demodulated clock signal DSCL. The third circuit can change the state of the initial clock signal SCL according to the received control signal, so that the state of the initial clock signal can correspond to the clock stretch state of the plurality of components 370, 371, and 372 on the outdoor antenna module 302, thereby realizing bidirectional transmission of the clock signal.

Figure 4:
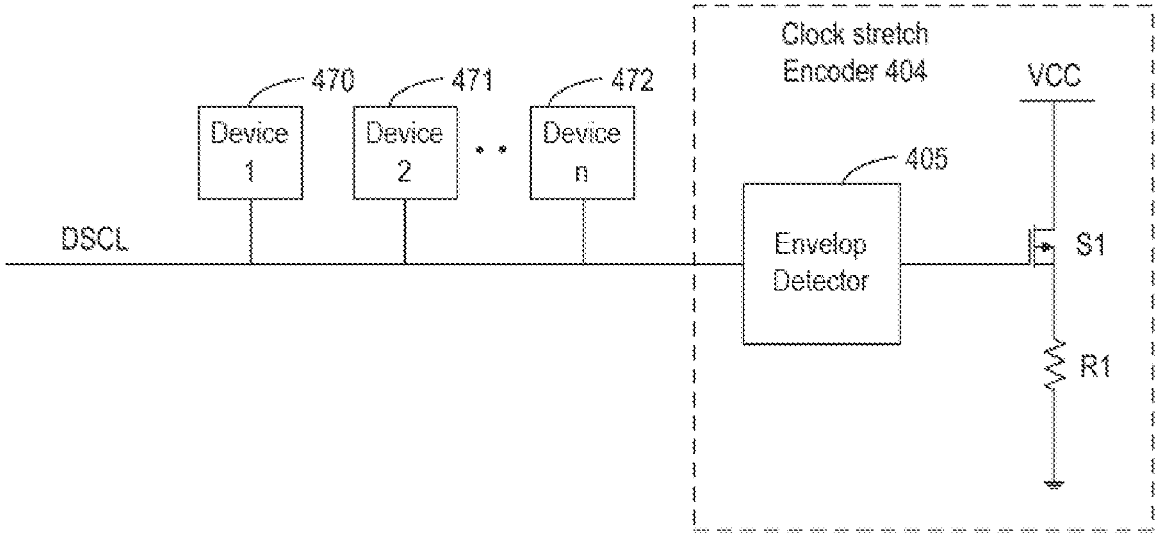
FIG. 4 illustrates an exemplary circuit structure of the clock stretch encoder in accordance with some example implementations of the present disclosure.

Hereinafter, an exemplary circuit structure of the clock stretch encoder in accordance with some example implementations of the present disclosure will be described with reference to FIG. 4. As illustrated in FIG. 4, the $I^2C$ devices 470, 471, and 472 correspond to the $I^2C$ devices 370, 371, and 372 of FIG. 3A or 3B, the envelop detector 405 corresponds to the envelop detector 305 of FIG. 3A or 3B, and the clock stretch encoder 404 corresponds to the clock stretch encoder 304 of FIG. 3A or 3B.

As shown in FIG. 4, the clock stretch encoder 404 includes an envelope detector 405 and a switch S1. The envelope detector 405 is connected to the demodulator to receive the demodulator clock signal DSCL from the demodulator, wherein the plurality of components 470, 471, and 472 are connected to the connection path between the demodulator and the envelope detector 405. The switch S1 is controlled by the envelope detector 405 to be turned on or turned off.

In normal operation, that is to say, $I^2C$ devices 470, 471, and 472 do not trigger clock stretch, the DSCL is either at a high level or at a low level for reading and writing operation, or stays at a high level when the transaction is finished. The envelope detector 405 may output a relatively high voltage higher than a certain voltage, and this relatively high voltage may turn off the switch S1. However, if any of $I^2C$ devices 470, 471, and 472 trigger clock stretch, the output of the envelope detector 405 is low to turn on the switch S1. For example, the switch S1 may be a P-channel Metal Oxide Semiconductor (PMOS) transistor.

As can be seen from FIG. 4, the switch S1 is connected between a power source Vcc and the ground, and a dummy load, such as a resistor R1, is connected in serial with the switch S1. When the switch S1 is turned on, the dummy load R1 may be enabled, such that a current may flow through the resistor R1, and thus, the current on the antenna module may change relatively significantly. For example, a relatively high current higher than that in normal operation may flow through the RF cable 350. The relatively high current may be sensed by the clock stretch decoder provided on the AP.

Figure 5:
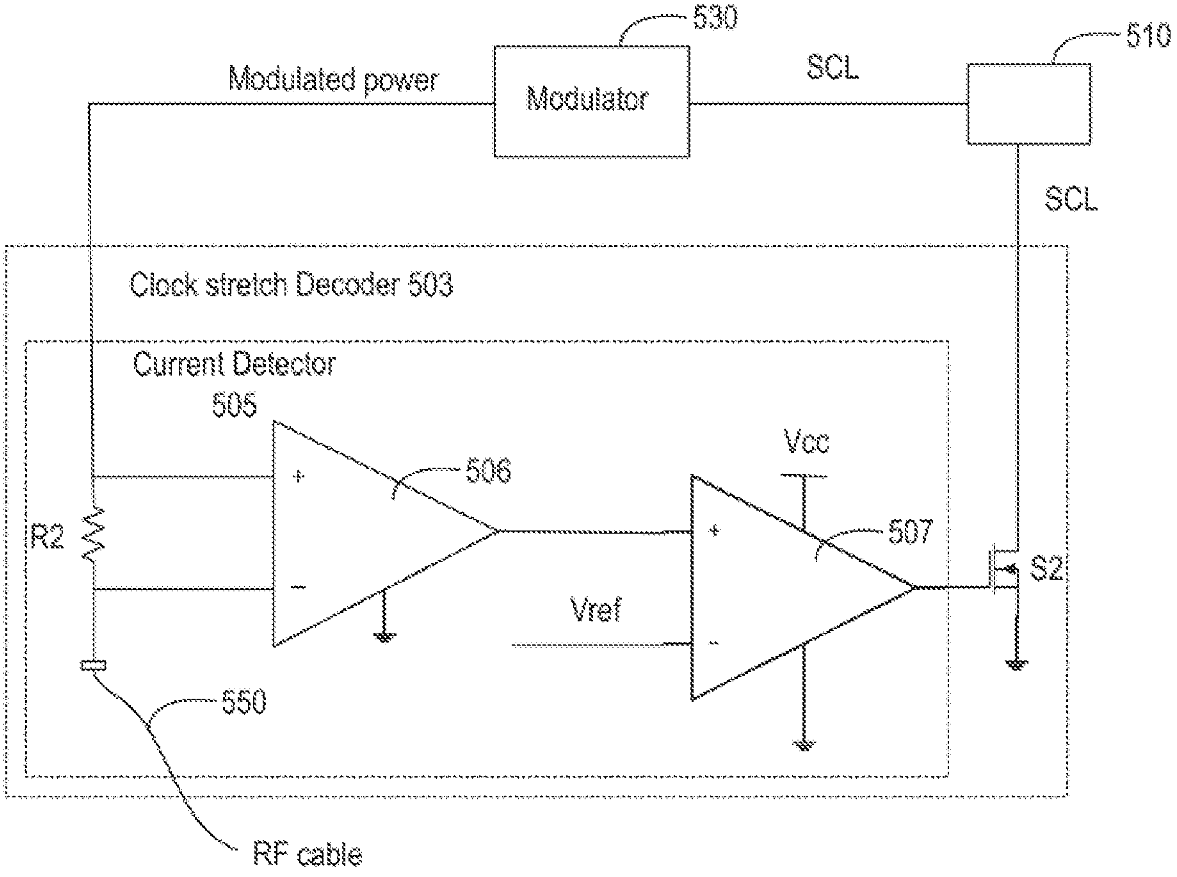
FIG. 5 illustrates an exemplary circuit structure of the clock stretch decoder in accordance with some example implementations of the present disclosure.

The exemplary circuit structure of the clock stretch decoder in accordance with some example implementations of the present disclosure will be described with reference to FIG. 5. As illustrated in FIG. 5, the clock signal source 510 corresponds to the clock signal source 310 of FIG. 3A or 3B, the clock stretch decoder 503 corresponds to the clock stretch decoder 303 of FIG. 3A or 3B, the current detector 505 corresponds to the current detector 305 of FIG. 3A or 3B the RF cable 550 corresponds to the RF cable 350 of FIG. 3A or 3B, and the modulator 530 corresponds to the modulator 330 of FIG. 3A or 3B.

As illustrated in FIG. 5, the clock stretch decoder 503 comprises a current detector 505 and a switch S2, and the current detector 505 may be an example of the second circuit, and the circuit for the switch S2 may be an example of the third circuit. The current detector 505 is connected between the modulator 530 and the radio frequency cable 550 connected to the outdoor antenna module, and thus the current detector 505 may sense a current change associated with a change in the power consumption level of the outdoor antenna module, through the radio frequency cable 550. As mentioned above, when the switch S2 is turned on due to a clock stretch of the $I^2C$ devices, the dummy load R1 may be enabled, such that the current may flow through the resistor R1, and thus, the current on the antenna module may change relatively significantly. The current detector 505 may sensor this significant change of the current by the RF cable 550.

As illustrated in FIG. 5, the current detector 505 comprises a resistor R2 connected between the modulator 530 and the radio frequency cable 550; an amplifier 506 connected to two ends of the resistor R2 to amplify a voltage drop between the two ends of the resistor R2; and a comparator 507 connected between the amplifier and the switch S2. In some implementations, the resistor R2 is a shunt resistor, and has a quite low resistance value, for example, 0.1Ω. If the current flow through the RF cable 550 is 1A, the voltage drop of the resistor R2 may be 0.1V, and if the current flow through the RF cable 550 when the dummy load R1 is enabled is 2A, the voltage drop of the resistor R2 may be 0.2V. The amplifier 506 is provided to amplify the voltage drop, and the voltage drop may reflect the current in the RF cable 550 and power consumption level of the antenna module.

For example, when the dummy load R1 is enabled, the antenna module may run at the minimum power consumption (for example, the power consumption of the $I^2C$ devices and the antennas keeps low, and when the dummy load R1 is disabled, the antenna module may run at the maximum power consumption (for example, the power consumption of the $I^2C$ devices and the antennas keeps high). Then, the amplifier 506 may output a low detected voltage DV1 corresponding to low current on the shunt resistor R2, which in turn corresponds to normal operation of the $I^2C$ devices. The amplifier 506 may output a high detected voltage DV2 corresponding to high current on the shunt resistor R2, which in turn corresponds to clock stretch triggering of the $I^2C$ devices.

As shown in FIG. 5, the comparator 507 is connected between the amplifier 506 and the switch S2. The reference voltage is between the DV1 and DV2, for example, DV1<Vref<DV2. For example, the switch S2 may be N-channel metal oxide semiconductor (NMOS) transistor. Therefore, in the case that the detected voltage DV1 is input into the comparator 507, the comparator 507 may output a low level signal to turn off the switch S2, and in the case that the detected voltage DV2 is input into the comparator 507, the comparator 507 may output a high level signal to turn on the switch S2. When the switch S2 is turned on, the clock signal source 510 may be connected to the ground and then output a clock signal with low level. That is to say, in the case of clock stretch triggering of the $I^2C$ devices, the clock signal source 510 on the AP may be pulled down to a low level for a while to associate with the clock stretch triggering, and in the absence of the clock stretch triggering of the $I^2C$ devices, the clock signal source 510 on the AP may not be pulled down for a period of time, but output normal clock signal.

As shown in FIG. 4 and FIG. 5, by including the clock stretch encode and the clock stretch decoder, when at least one of the plurality of components triggers the clock stretch, the state of demodulated clock signal DSCL will change, and the clock stretch encoder 304 can change the power consumption level of the outdoor antenna module according to the state change. The current detector can sense changes in the power consumption level of the outdoor antenna module and can output a control signal corresponding to the power consumption level. The control signal can control the switch S2 connected to the ground. The switch S2 also receives an initial clock signal SCL, which is processed to become a demodulated clock signal DSCL. The third circuit can change the state of the initial clock signal SCL according to the received control signal, so that the state of the initial clock signal can be associated with the clock stretch state of the plurality of components on the outdoor antenna module, thereby realizing bidirectional transmission of the clock signal.

Figure 6:
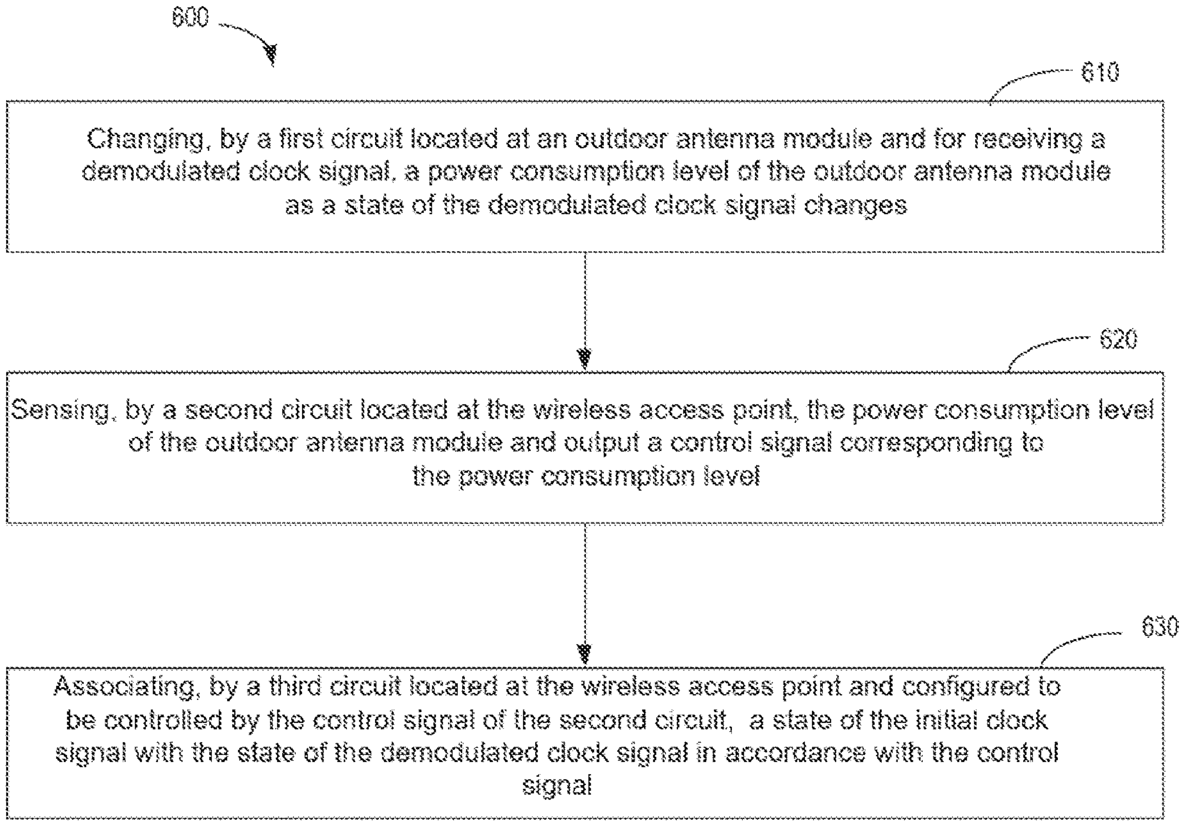
FIG. 6 illustrates an exemplary method for associating a state of an initial clock signal with a state of a demodulated clock signal in accordance with some example implementations of the present disclosure.

FIG. 6 illustrates an exemplary method 600 for associating a state of an initial clock signal with a state of a demodulated clock signal in accordance with some example implementations of the present disclosure.

As shown in FIG. 6, at block 610, the method 600 comprises changing, by a first circuit 306, which is located at an outdoor antenna module and receives a demodulated clock signal, a power consumption level of the outdoor antenna module as a state of the demodulated clock signal changes. In some implementations, the change of the state of the demodulated clock signal is associated with a clock stretch of at least one of a plurality of components on the outdoor antenna module that are configured to use the demodulated clock signal, for example, the $I^2C$ devices 370, 371, and 372.

At block 620, the method 600 further comprises sensing, by a second circuit 307, which is located at the wireless access point, the power consumption level of the outdoor antenna module and output a control signal corresponding to the power consumption level. At block 630, the method 600 further comprises associating, by a third circuit 308, which is located at the wireless access point and configured to be controlled by the control signal of the second circuit, a state of the initial clock signal with the state of the demodulated clock signal in accordance with the control signal.

By including the first, second, and third circuits, when at least one of the plurality of components triggers the clock stretch, the state of demodulated clock signal DSCL will change, and first circuit can change the power consumption level of the outdoor antenna module according to the state change. The second circuit can sense change in the power consumption level of the outdoor antenna module and can output a control signal corresponding to the power consumption level. The control signal can control the third circuit connected to the ground. The third circuit also receives an initial clock signal SCL, which is processed to become a demodulated clock signal DSCL. The third circuit can change the state of the initial clock signal SCL according to the received control signal, so that the state of the initial clock signal can be associated with the clock stretch state of the plurality of components on the outdoor antenna module, thereby realizing bidirectional transmission of the clock signal.

In the context of this disclosure, while operations are depicted in a particular order, this should not be understood as requiring that such operations be performed in the particular order shown or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable subcombination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A circuitry system for a wireless system comprising an outdoor antenna module and a wireless access point, comprising:

a first circuit located at the outdoor antenna module and configured to receive a demodulated clock signal and configured to change a power consumption level of the outdoor antenna module as a state of the demodulated clock signal changes, wherein the change of the state of the demodulated clock signal is associated with a clock stretch of at least one of a plurality of components on the outdoor antenna module that are configured to use the demodulated clock signal;

a second circuit located at the wireless access point configured to sense the power consumption level of the outdoor antenna module and output a control signal corresponding to the power consumption level; and a third circuit located at the wireless access point configured to receive an initial clock signal and the control signal of the second circuit, and associate a state of the initial clock signal with the state of the demodulated clock signal in accordance with the control signal.

2. The circuitry system of claim 1, wherein the outdoor antenna module is provided with a demodulator for generating the demodulated clock signal; and the plurality of components is connected to a connection path between the demodulator and the first circuit to change the state of the demodulated clock signal when at least one of the plurality of components triggers the clock stretch.

3. The circuitry system of claim 2, wherein the first circuit comprises:

an envelope detector connected to the demodulator to receive the demodulated clock signal, wherein the plurality of components is connected to the connection path between the demodulator and the envelope detector; and a first switch connected to the envelope detector and configured to be controlled to be switched on or switched off by the envelope detector, wherein the envelope detector is configured to switch on the first switch to change the power consumption level of the outdoor antenna module when at least one of the plurality of components triggers the clock stretch.

4. The circuitry system of claim 3, wherein the first circuit further comprises a load connected with the first switch in serial and configured to be enabled when the first switch is switched on and to be disabled when the first switch is switched off.

5. The circuitry system of claim 1, wherein the demodulated clock signal keeps at a low level when at least one of the plurality of components triggers the clock stretch.

6. The circuitry system of claim 1, wherein the wireless access point comprises a modulator, a first power supply for providing a first power voltage, and a second power supply for providing a second power voltage, and wherein the modulator is configured to modulate the initial clock signal with the first power voltage and the second power voltage to be a modulated power.

7. The circuitry system of claim 6, wherein the second circuit is connected between the modulator and a radio frequency cable connected to the outdoor antenna module.

8. The circuitry system of claim 7, wherein the second circuit is configured to sense a current change associated with a change in the power consumption level of the outdoor antenna module through the radio frequency cable.

9. The circuitry system of claim 7, wherein the second circuit comprises a current detector comprising:

a resistor connected between the modulator and the radio frequency cable for sensing current change associated with a change in the power consumption level of the outdoor antenna module through the radio frequency cable;

an amplifier connected to two ends of the resistor to amplify a voltage drop between the two ends of the resistor; and a comparator connected between the amplifier and the third circuit and configured to output the control signal to control the third circuit based on current flowing through the resistor.

10. The circuitry system of claim 1, wherein the third circuit comprises a second switch connected between a clock signal source for generating the initial clock signal and a ground, and the second switch is configured to be switched on by the second circuit to connect the clock signal source for generating the initial clock signal to the ground when at least one of the plurality of components triggers the clock stretch, such that the initial clock signal becomes to be a low level.

11. A wireless system, comprising:

an outdoor antenna module configured to generate a demodulated clock signal and provided with a plurality of components configured to use the demodulated clock signal;

a wireless access point connected to the outdoor antenna module; and a circuitry system, comprising:

a first circuit located at the outdoor antenna module and configured to receive the demodulated clock signal to change a power consumption level of the outdoor antenna module as a state of the demodulated clock signal changes, wherein the change of the state of the demodulated clock signal is associated with a clock stretch of at least one of the plurality of components;

a second circuit located at the wireless access point configured to sense the power consumption level of the outdoor antenna module and output a control signal corresponding to the power consumption level; and a third circuit located at the wireless access point configured to receive an initial clock signal and the control signal of the second circuit, and associate a state of the initial clock signal with the state of the demodulated clock signal in accordance with the control signal.

12. The wireless system of claim 11, wherein the outdoor antenna module is provided with a demodulator for generating the demodulated clock signal; and the plurality of components is connected to a connection path between the demodulator and the first circuit to change the state of the demodulated clock signal when at least one of the plurality of components triggers the clock stretch.

13. The wireless system of claim 12, wherein the first circuit comprises:

an envelope detector connected to the demodulator to receive the demodulated clock signal, wherein the plurality of components is connected to the connection path between the demodulator and the envelope detector; and a first switch connected to the envelope detector and configured to be controlled to be switched on or switched off by the envelope detector, wherein the envelope detector is configured to switch on the first switch to change the power consumption level of the outdoor antenna module when at least one of the plurality of components triggers the clock stretch.

14. The wireless system of claim 13, wherein the first circuit further comprises a load connected with the first switch in serial and configured to be enabled when the first switch is switched on and to be disabled when the first switch is switched off.

15. The wireless system of claim 11, wherein the wireless access point comprises a modulator, a first power supply for providing a first power voltage, and a second power supply for providing a second power voltage, and wherein the modulator is configured to modulate the initial clock signal with the first power voltage and the second power voltage to be a modulated power.

16. The wireless system of claim 15, wherein the second circuit is connected between the modulator and a radio frequency cable connected to the outdoor antenna module and configure to sense a current change associated with a change in the power consumption level of the outdoor antenna module through the radio frequency cable.

17. The wireless system of claim 16, wherein the second circuit comprises a current detector comprising:

a resistor connected between the modulator and the radio frequency cable for sensing current change associated with a change in the power consumption level of the outdoor antenna module through the radio frequency cable;

an amplifier connected to two ends of the resistor to amplify a voltage drop between the two ends of the resistor; and a comparator connected between the amplifier and the third circuit and configured to output the control signal to control the third circuit based on current flowing through the resistor.

18. The wireless system of claim 11, wherein the third circuit comprises a second switch connected between a clock signal source for generating the initial clock signal and a ground, and the second switch is configured to be switched on by the second circuit to connect the clock signal source for generating the initial clock signal to the ground when at least one of the plurality of components triggers the clock stretch, such that the initial clock signal becomes to be a low level.

19. A method, comprising:

changing, by a first circuit located at an outdoor antenna module and for receiving a demodulated clock signal, a power consumption level of the outdoor antenna module as a state of the demodulated clock signal changes, wherein the change of the state of the demodulated clock signal is associated with a clock stretch of at least one of a plurality of components on the outdoor antenna module that are configured to use the demodulated clock signal;

sensing, by a second circuit located at a wireless access point, the power consumption level of the outdoor antenna module and output a control signal corresponding to the power consumption level; and associating, by a third circuit located at the wireless access point and configured to be controlled by the control signal of the second circuit, a state of an initial clock signal with the state of the demodulated clock signal in accordance with the control signal.

* * * * *